C. HOLLE, Jr.
MAGNIFYING ATTACHMENT FOR SLIDE RULES.
APPLICATION FILED APR. 5, 1920.

1,387,267.

Patented Aug. 9, 1921.

INVENTOR.
CRISTIAN HOLLE, JR.
BY
ATTORNEY

UNITED STATES PATENT OFFICE.

CHRISTIAN HOLLE, JR., OF SAN DIEGO, CALIFORNIA.

MAGNIFYING ATTACHMENT FOR SLIDE-RULES.

1,387,267.  Specification of Letters Patent.  Patented Aug. 9, 1921.

Application filed April 5, 1920. Serial No. 371,516.

*To all whom it may concern:*

Be it known that I, CHRISTIAN HOLLE, Jr., a citizen of the United States, residing at San Diego, in the county of San Diego and State of California, have invented certain new and useful Improvements in Magnifying Attachments for Slide-Rules, of which the following is a specification.

My invention relates to a magnifying attachment for slide rules and the objects of my invention are: First, to provide a magnifying attachment which may be readily connected to the ordinary slide rule reading glass without any change of structure thereby making it applicable for use in connection with the conventional slide rules now in use; second, to provide a magnifying attachment of this class which is so constructed that it will adhere to the ordinary slide rule reading glass; third, to provide an attachment of this class with translucent ends to prevent shadows from the sides of the slide rule interfering with the proper magnifying effect; fourth, to provide a device of this class which is very simple and economical of construction, durable, easy to apply and applicable to the various makes of slide rules now in use.

Figure 1:
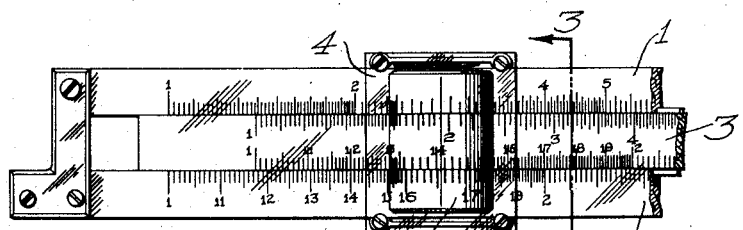
Figure 2:
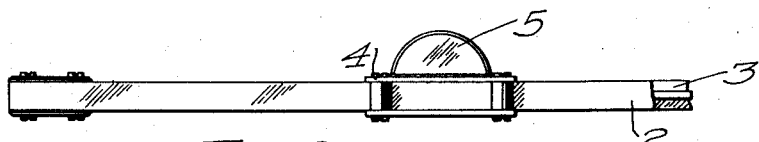
Figure 3:
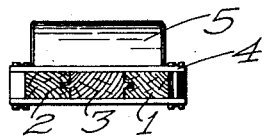
Figure 4:
Figure 5:
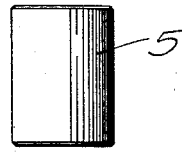

With these and other objects in view as will appear hereinafter my invention consists of certain novel features of construction, combination and arrangement of parts and portions as will be hereinafter described in detail and particularly set forth in the appended claim, reference being had to the accompanying drawings and to the characters of reference thereon which form a part of this application in which:

Figure 1 is a top or plan view of a fragmentary portion of a slide rule of a conventional type with my device positioned thereon; Fig. 2 is a side elevational view thereof; Fig. 3 is a sectional view through 3—3 of Fig. 1; Fig. 4 is an end view of the magnifying glass alone and Fig. 5 is a top view thereof.

Similar characters of reference refer to similar parts and portions throughout the several views of the drawings.

The slide rule side members 1 and 2, slide member 3, reading glass 4 and attachment 5 constitute the principal parts and portions of the complete magnifying slide rule. The members 1, 2, 3, and 4 are of the ordinary or conventional type and mounted on the reading glass on either side is a semi-cylindrical, transparent member 5 provided with a positively flat side engaging the reading glass and positioned so that its straight ends are parallel with the sides of the rule. It is secured to the glass by wetting the flat surface and pressing tightly thereon, usually termed adhesion. The ends of this transparent member 5 are translucent to prevent shadows from the sides of the rule. It will be noted that the curved, partial cylindrical form with the flat sides provides a magnifying glass for slide rules which may be readily attached thereto and removed therefrom, which are sufficiently stable for all ordinary operative purposes.

Having thus described my invention what I claim as new and desire to secure by Letters Patent is:

The combination with the ordinary reading glass of a slide rule, of a transparent member flat on one side and cylindrical on the other side secured thereto by adhesion of the flat surface of the glass and provided with flat translucent ends.

In testimony whereof, I have hereunto set my hand at San Diego, California, this 27th day of March, 1920.

CHRISTIAN HOLLE, JR.